United States Patent [19]

Dierenbach et al.

[11] Patent Number: 5,180,886
[45] Date of Patent: Jan. 19, 1993

[54] WALLBOX ELECTRIC DEVICE ASSEMBLY

[75] Inventors: Karl Dierenbach, Perkasie; Elliot G. Jacoby, Jr., Glenside, both of Pa.; Dan A. Snavely, Johnson City, N.Y.; Darryl W. Tucker, Royersford; Scott N. Walck, Allentown, both of Pa.; Scott N. Walck, Allentown, both of Pa.

[73] Assignee: Lutron Electronics Co., Inc., Coopersburg, Pa.

[21] Appl. No.: 391,759

[22] Filed: Aug. 9, 1989

[51] Int. Cl.⁵ .................................................. H02G 3/14
[52] U.S. Cl. ........................................ 174/66; 220/241
[58] Field of Search ............ 174/66, 67; 220/241, 220/242; 439/536; D8/350-353; D13/137, 143, 152, 154, 156

[56] References Cited

U.S. PATENT DOCUMENTS

| D. 159,413 | 7/1950 | Hayman | D8/353 |
|---|---|---|---|
| 1,726,429 | 8/1929 | Ferris | 174/66 X |
| 1,840,582 | 1/1932 | Hubbell | 220/241 |
| 2,634,016 | 4/1953 | Hagen | 220/241 |
| 2,740,873 | 4/1956 | Cronk | 220/241 X |
| 3,438,534 | 4/1969 | Zerwes | 220/241 |
| 3,619,477 | 11/1971 | Rasmussen | 220/241 X |
| 4,733,330 | 3/1988 | Tanaka et al. | 174/66 X |
| 4,833,277 | 5/1989 | Jacoby et al. | 220/241 X |
| 4,835,343 | 5/1989 | Graef et al. | 174/66 |

OTHER PUBLICATIONS dP Distepro, Inc. Brochure.
Lutron Electronics Brochure-Nova T*-P/N 360-201 Feb. 1988.
Pass & Seymour Catalog No. 500, p. L-13 1988.
Wiremold Receptacle Cap-Descriptive literature.
Slater Catalog No. 184M, p. 27 Jan. 1984.
We Care Inc. Brochure-The Care Cover TM -The Total Outlet Cover.

*Primary Examiner*—Leo P. Picard
*Assistant Examiner*—David Tone
*Attorney, Agent, or Firm*—Seidel, Gonda, Lavorgna & Monaco

[57] ABSTRACT

A facade assembly for an electric socket consists of a support for mounting to the socket, a cover plate to provide a raised decorative area that covers the socket, and a wallplate to surround the raised area and snap onto the cover plate. The facade assembly provides an attractive "designer-style" appearance that permits easy replacement of modular elements that determine the aesthetic qualities of the assembly.

22 Claims, 3 Drawing Sheets

WALLBOX ELECTRIC DEVICE ASSEMBLY

BACKGROUND OF THE INVENTION

1. Field of the Invention

This invention relates to an electric socket assembly and, more particularly, to an assembly that includes a decorative facade.

2. Description of the Related Art

Electric sockets, which include power distribution sockets (commonly known as receptacles), sockets for phone jacks and cable jacks, etc., are found in substantially all buildings that have electrical service. A standard duplex receptacle has sockets to accommodate two standard electric plugs. A threaded hole in the center of the receptacle permits a wallplate to be screwed onto the receptacle and mounted against a wall. An alternative receptacle and wallplate arrangement is the "designer" style, in which the sockets are within a decorative rectangular structure and the wallplate attaches around the periphery of the rectangle. A designer style receptacle with a snap-on wallplate is available from Lutron Electronics Co., Coopersburg, Pa. Designer style phone jack and cable jack socket assemblies, for use with conventional (screw-on) wallplates, are also available commercially.

Devices are known that provide covers for receptacles, for reasons of safety, energy conservation, or aesthetics. For example, the Care Cover TM socket cover, available from WE CARE, Inc., of Pierre, S. Dak., replaces a standard receptacle wallplate and covers the entire receptacle, including the holes that accommodate the electric plug prongs. The cover has a foam-insulated backing to reduce outside air infiltration. A spring-loaded sliding element is moved aside when a plug is inserted and slides back in front of the holes when the plug is removed. Thus, the cover provides thermal insulation and prevents small children from inserting objects into the socket.

Receptacle caps are available for use with multioutlet assemblies. These assemblies consist of a number of individual sockets arranged in a line and enclosed within a molding; for example, Plugmold ® multioutlet assemblies, available from The Wiremold Company, West Hartford, Conn. The receptacle cap is a plastic cover having holes that can be aligned with the prong holes in an individual outlet. Colored caps permit one to change the colors of the outlets. Installing a cap requires opening the molding, placing the cap over the outlet, and reclosing the molding.

A two-piece facade for a wallbox mounted device was disclosed in U.S. Pat. No. 4,835,343, issued May 30, 1989, to J. T. Graef et al., incorporated herein by reference. That patent relates to a combination wallbox mounted switch device and facade, which are well suited for the decorator style. The combination includes a cover plate that permits the wallplate to be mounted with snap connections and to have an outer surface undisturbed by features that relate to its mounting.

Coordinating the color of a receptacle, or other type of electric socket, with colors of walls or other room colors present vexing problems that are not readily solved by prior art devices. During construction, for example, if a receptacle assembly is installed in a wall before all elements of construction are complete, there is the risk of damage to the decorative surfaces of the receptacle. (i.e., the surfaces that are visible when the complete assembly is mounted in a wall). Alternatively, if the assembly is incomplete, then power cannot be provided to the receptacle without posing a safety hazard. Furthermore, an electrician is needed to finally install the remaining elements of the assembly, after construction is complete. Thereafter, changing the color of a receptacle again requires the services of an electrician to remove and replace the receptacle safety. Thus, the problem with prior art receptacles is a result of a cover performing both decorative and safety functions.

SUMMARY OF THE INVENTION

In accordance with the present invention, a wallbox mountable electric device comprises, in combination:

a) an electric socket for receiving a plug,
b) means for supporting said socket, and
c) a plurality of decorative components attachable to said support means, each component being individually removable and replaceable by any one of a plurality of similarly configured components having a variety of colors and textures.

In accordance with another embodiment of this invention, a wallbox mountable electric device comprises, in combination:

a) an electric socket for receiving a plug,
b) means for supporting said socket, and
c) decorative cover means, removably attachable to said support means, for substantially covering said socket, said cover means having a decorative surface, uninterrupted by visible attachment means, with at least one opening to permit insertion of a plug into said socket.

In accordance with another embodiment of this invention, a decorative means for covering a wallbox mounted electric socket comprises:

a) a decorative surface, uninterrupted by visible attachment means, which substantially covers said socket, and
b) an opening in said decorative surface to permit insertion of a plug into said socket.

In accordance with another embodiment of this invention, a wallbox mountable electric device comprises, in combination:

a) an electric socket having a plurality of terminals,
b) means for supporting said socket,
c) a protective plate, attachable to said support, to prevent access to said terminals when said electric device is mounted in said wallbox, and
d) decorative cover means, removably attachable to said support means, for substantially covering said socket, said cover means having an opening to permit insertion of a plug into said socket.

In accordance with another embodiment of the present invention, a facade assembly for an electric receptacle having one or more sockets comprises, in combination:

a) a generally rectangular yoke plate,
b) a generally rectangular cover plate, and
c) a wallplate;
said yoke plate having
  i) a first through opening in said yoke plate for a fastener to attach said yoke plate to said receptacle,
  ii) at least one second through opening to permit each socket of said receptacle to extend through said yoke plate, and iii) a plurality of connector means to permit attachment of said cover plate in substantially parallel and juxtaposed relationship to said yoke plate;

said cover plate having i) a first surface that faces said yoke plate and a second surface opposite to said first surface, ii) a slightly raised area extending from said second surface to form a third surface, which is generally parallel to said second surface and which has a generally rectangular perimeter, iii) a plurality of connector means for alignment with said connector means in said yoke plate, iv) a plurality of through openings within the perimeter of said third surface for alignment with openings in said socket to permit the prongs of a standard electric plug to be operatively inserted into said socket while said yoke and cover plates are attached to said receptacle, and v) a plurality of snap attachment means; and said wallplate having i) an interior surface that faces said cover plate and an exterior surface opposite to said interior surface, ii) a plurality of snap attachment means extending from said interior surface for engagement with corresponding ones of said snap attachment means of said cover plate for demountable engagement of said wallplate in substantially parallel and juxtaposed relationship with said cover plate, iii) a substantially rectangular through opening to surround and adjoin said perimeter of said third surface of said cover plate, said exterior surface being substantially flat, having no features that relate to said snap connectors, and having length and width at least equal to the length and width of said cover plate.

The assembly of the present invention overcomes the difficulties of changing the color of a receptacle or other electric socket. During construction, a receptacle can be installed in a wallbox, with access to wiring within the wallbox blocked by a non-decorative protective support plate. Thus, the receptacle can be safely energized. Only after construction is completed are the decorative elements mounted onto the receptacle. Thus these elements need not be present during construction, when they can easily be marred. They can be installed easily once construction is complete, without requiring an electrician's service. Thereafter, the decorative facade elements can be easily removed and replaced with elements having a different color and/or texture, without removing the protective plate (which would generally require and electrician). Thus, the present invention separates the decorative and safety functions of socket covers.

DETAILED DESCRIPTION OF THE INVENTION

As used in this specification and the appended claims, the term "facade" refers generally to one or more elements that cover a wallbox-mounted electric socket or control device. "Wallplate" refers more narrowly to a plate that surrounds a socket or control device and may be an element of a facade.

The facade assembly of the present invention provides an electric socket with an attractive appearance that can be modified—for example, its color and/or surface texture changed—by simple replacement of modular components.

There are a number of "standard" configurations for wallbox-mounted electric devices and their accompanying accessories. A particularly attractive configuration is known as the "designer style." Dimensions for designer-style receptacles and wallplates are defined by NEMA Standard 1-6-1966, in Standards Publication No. WD1-1979, page 16. This style wallplate accommodates devices that have a vertically-elongated rectangular structure extending from the surface of a support or "yoke" plate. The wallplates have a central opening that accommodates and surrounds the rectangular structure. The wallplate generally mounts to the yoke plate with mounting screws located near the top and bottom edges of the plate. Alternatively, the wallplate may be snap-mounted, as disclosed in U.S. Pat. No. 4,835,343 ('343), discussed earlier.

Figure 1:
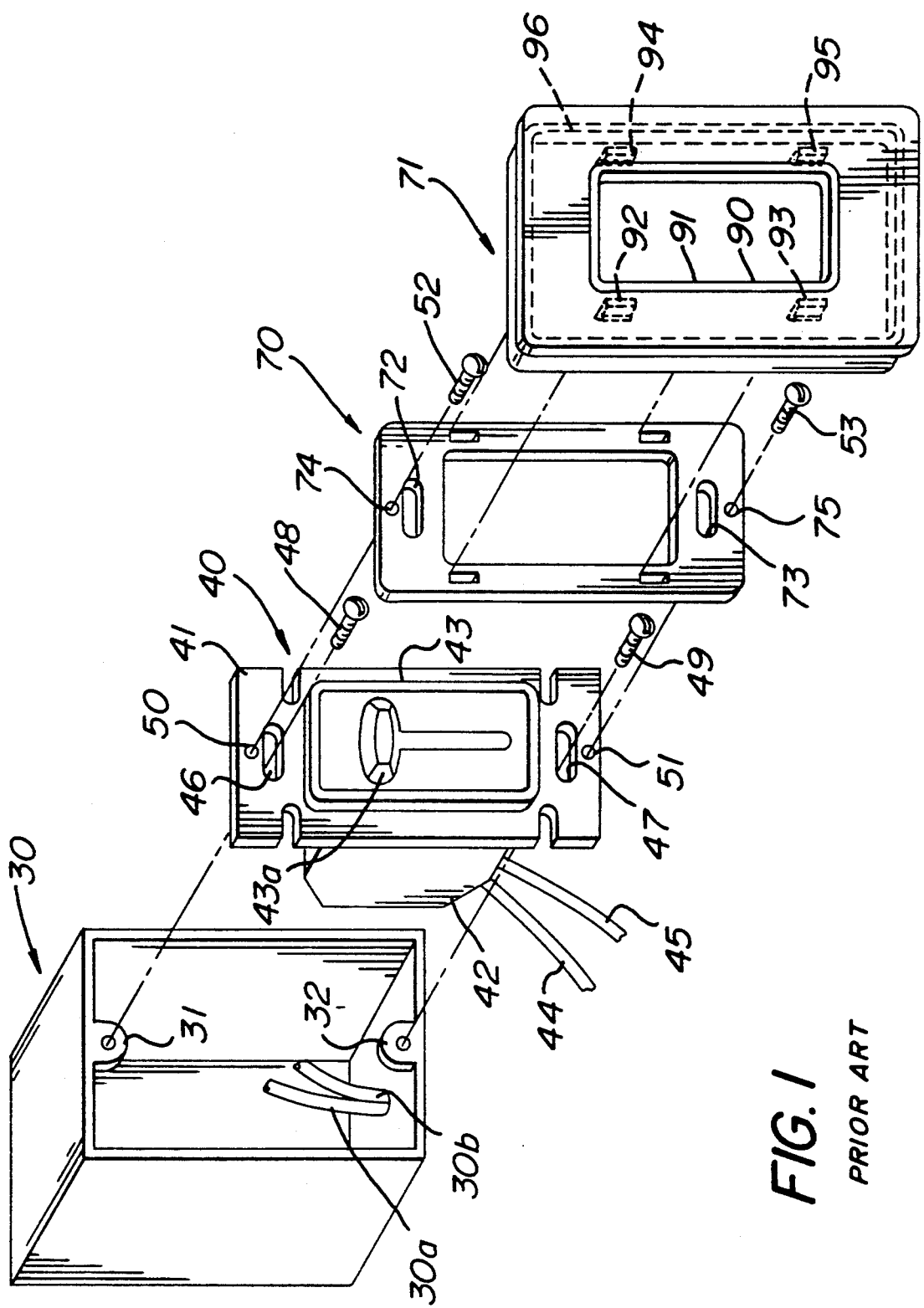
FIG. 1 depicts a prior art electric device with facade assembly.

FIG. 1 depicts the designer-style wallbox-mounted electric control device of '343. Wallbox 30 has "knockouts" to permit the introduction of electric wiring, which extends through the building walls, shown as wires 30a and 30b. Wires 30a and 30b can be connected to lamp loads or the like which are to be controlled by the electric control device. Wallbox 30 is also provided with threaded mounting openings 31 and 32, which are on standard centers and are adapted to receive mounting screws for mounting a control device within wallbox 30.

Control device 40 of FIG. 1 is a light dimmer. Light dimmer 40 consists of a metallic yoke plate 41 having a backbox 42 on its rear surface and a rectangular structure 43 extending from its front surface.

A manually operable slider has a slider handle 43a projecting beyond the front surface of structure 43. Movement of the handle between its end positions causes dimming of the lighting load and, when the lowest position is reached, causes the opening of a switch that is in series with wires 44 and 45 to turn off the lighting load.

Backbox 42 encloses the control mechanism of dimmer 40 and insulates it from accidental contact with wires or grounds in wallbox 30. Leads 44 and 45 extend through an opening in backbox 42 and may be connected to wires 30a and 30b.

Yoke plate 41, which is a generally flat thin metal stamping, is of conventional structure and has two laterally elongated openings 46 and 47. Mounting screws 48 and 49 pass through openings 46 and 47, respectively, and are threaded into openings 31 and 32, respectively, to mount dimmer 40 to wallbox 30. Yoke 41 also has tapped openings 50 and 51, which are on standard centers and receive screws 52 and 53.

Cover plate 70 is a generally flat plate having laterally elongated openings 72 and 73 which are sufficiently large to receive the protruding heads of screws 48 and 49 after those screws are screwed into place in wallbox 30. Screws 52 and 53 thread into openings 50 and 51, respectively, in order to hold cover plate 70 to yoke 41. Openings 74 and 75 receive screws 52 and 53, and opening 76 receives rectangular structure 43.

Wallplate 71 has a rectangular opening 90, with a chamfer 91 around its periphery on its front surface.

Opening 90 fits over structure 43. Connectors 92, 93, 94, and 95 are elongated pedestals adapted to penetrate and then snap behind openings 80 to 83, respectively, in cover plate 70. Flange 96 extends from the edge of the back surface of wallplate 71.

Figure 2:
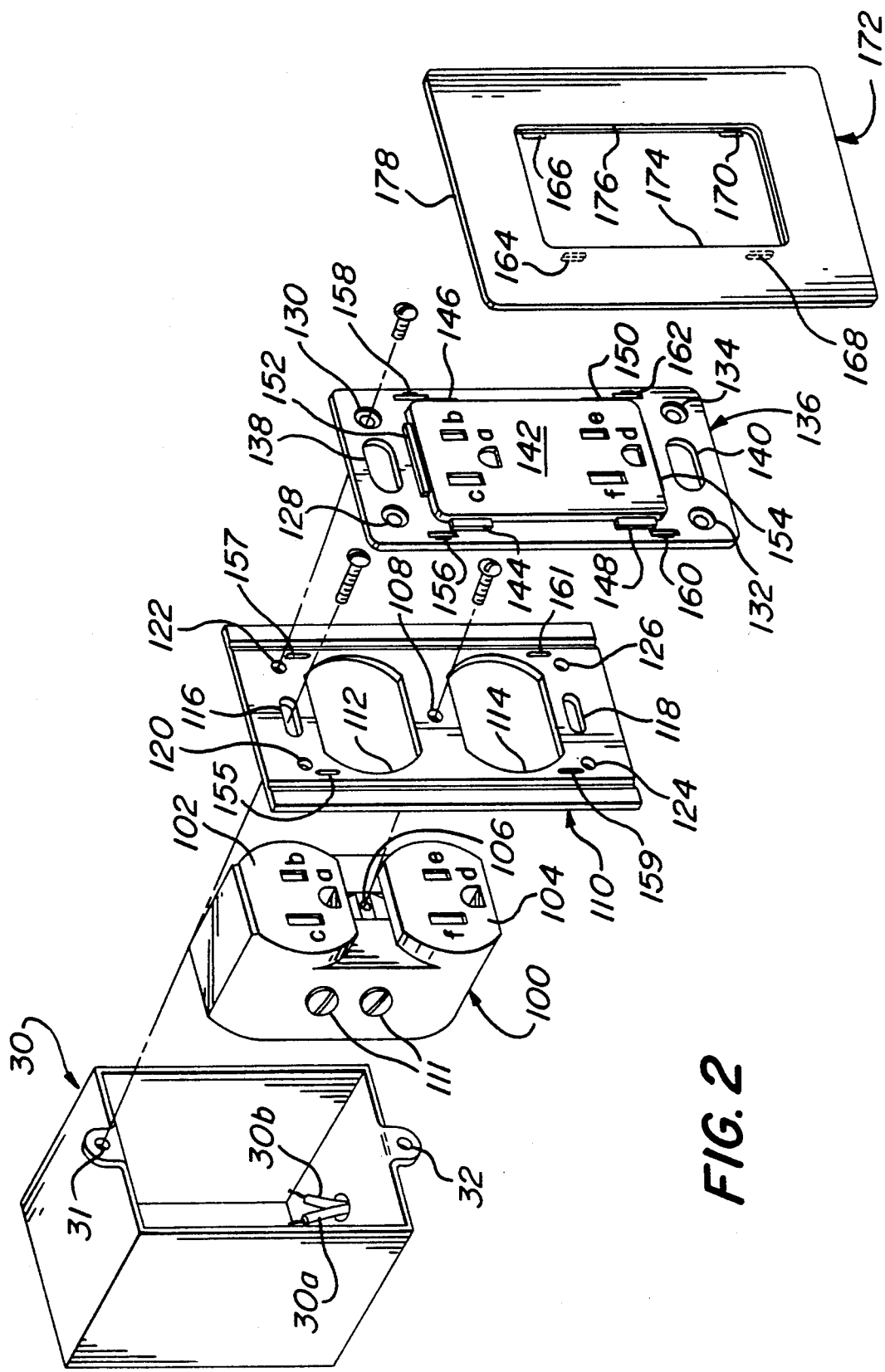
FIG. 2 is an exploded isometric view of an embodiment of the present invention.

FIG. 2 depicts an electric receptacle and facade assembly of the present invention. Receptacle 100 is depicted as a standard two-socket device mounted within wallbox 30, and sockets 102 and 104 provide electric interfaces between house wiring (e.g., 30a and 30b) and plug-in electric devices. Clearly, other types of receptacles can be used in place of the particular type shown in FIG. 2 (for example, a single socket or more than two sockets) with corresponding changes in the other elements of the assembly.

Likewise, other types of electric sockets—phone jack and cable jack outlets, for example—could be used in place of the receptacle shown. Optionally, receptacle 100 could include a switch (not shown) to disconnect one of the screw terminals 111 and/or a ground fault interrupter.

Threaded hole 106 aligns with hole 108 and accepts a mounting screw to permit yoke plate 110 to be attached to receptacle 100. For strength and safety, yoke plate 110 is preferably a metal plate. The plate blocks access to screw terminals 111 of receptacle 100. Openings 112 and 114 permit sockets 102 and 104, respectively, to extend through the yoke plate. Screws pass through holes 116 and 118 and into threaded holes 31 and 32, respectively, for mounting receptacle 100 and yoke plate 110 into wallbox 30. As shown, when yoke plate 110 is mounted, it covers wallbox 30. Optionally, yoke plate 110 has vertical grooves (not shown) about 5 mm in from its left and right edges to permit breaking off these edges for "multi-gang" applications, in which more than one device is mounted side-by-side and covered by a single facade. Threaded holes 120, 122, 124, and 126 accept mounting screws that pass through cover plate holes 128, 130, 132, and 134, respectively, to attach cover plate 136 to the yoke plate. Alternatively, any of a variety of snap connectors, well known in the art, can serve to join cover plate 136 to yoke plate 110. Plates 136 and 110 can also be joined magnetically.

Cover plate 136 is preferably molded from plastic, such as ABS plastic, which is preferably colored. Holes 138 and 140, are large enough to receive the protruding heads of the mounting screws that pass through holes 116, and 118, respectively. Raised area 142 extends from the front or "second" surface of cover plate 136 forming a decorative "third" surface. Through holes a, b, and c and d, e, and f in cover plate 136 align with corresponding holes in sockets 102 and 104, respectively. Optional raised areas 144, 146, 148, 150, 152, and 154 are raised from the surface of plate 136, by an amount less than raised area 142. Openings 156, 158, 160, and 162 align with and receive the wallplate snap projections 164, 166, 168, and 170, respectively to permit wallplate 172 to be snap-mounted onto cover plate 136. If the tips of snap projections 164, 166, 168, and 170 extend beyond the back surface of cover plate 136, they can be accommodated by grooves 155, 157, 159, and 161 in yoke plate 110, which align with openings 156, 158, 160, and 162, respectively in cover plate 136.

Wallplate 172 is preferably of molded plastic, such as ABS plastic, which is preferably colored to match or contrast with the color of cover plate 136. Central opening 174 in wallplate 172 receives and surrounds raised decorative surface 142. Optional chamber 176, which is on the front surface of wallplate 172, surrounding opening 174, tends to obscure any variation in coplanarity between the surface of wallplate 172 and raised decorative surface 142. Optional flange 178 is located around the perimeter of wallplate 172, either at or spaced slightly within the perimeter, and extends about 6 mm from the back surface of wallplate 172, enclosing a generally rectangular area whose length and width are greater than the length and width, respectively, of the opening in wallbox 30. Thus, when mounted, flange 178 engages the wall surface, enclosing the wallbox opening. By being positioned slightly (e.g., 2–4 mm) within the perimeter of wallplate 172, flange 178 obscures any slight variations in contact between the wall and wallplate 172.

When mounted on a wall, only the decorative surfaces of cover plate 136 and wallplate 172 are visible. Thus, replacing these elements changes the appearance (e.g., color, texture, material) of the assembly.

Figure 3:
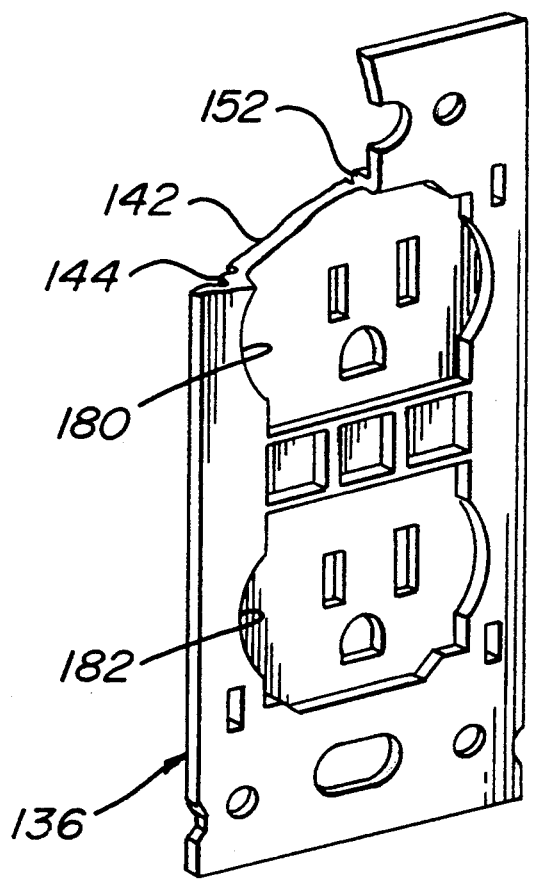
FIG. 3 is an isometric view of a cover plate of the present invention.

FIG. 3 is an isometric view of cover plate 136, viewed from the side opposite that shown in FIG. 2 and showing the back or "first" surface of adapter plate 136. Preferably, partially recessed areas 180 and 182 in the first surface align with openings 112 and 114, respectively, in yoke plate 110. Thus, when the elements are assembled, sockets 102 and 104 extend into partially recessed areas 180 and 182, respectively. As shown, the left and right edges of recessed areas 180 and 182 optionally have a separation greater than the width of raised decorative surface 142 and the top and bottom edges of recessed areas 180 and 182 optionally have a separation greater than the length of raised decorative surface 142. Partially raised (i.e., raised less than surface 142) areas 144, 146, 148, 150, 152, and 154, visible in FIG. 2 and shown in cutaway in FIG. 3, strengthen cover plate 136 in the regions where recessed areas 180 and 182 extend beyond the perimeter of raised decorative area 142. In addition, the partially raised areas provide a "fourth" surface, which serves as a bearing or "stop" surface for positive positioning of wallplate 172 when it is attached to cover plate 136, so that the front surfaces of raised decorative area 142 and wall plate 172 are preferably flush.

Since certain changes may be made in the above assembly without departing from the scope of the invention herein involved, it is intended that all matter contained in the above description or shown in the accompanying drawings shall be interpreted in an illustrative and not a limiting sense.

We claim:

1. A wallbox mountable electric device comprising, in combination:
    a) an electric socket for receiving a plug,
    b) means for supporting said socket, and
    c) a plurality of decorative components uninterrupted by visible attachment means and attachable to said support means, at least one said component substantially covering said socket and each component being individually removable and replaceable by any one of a plurality of similarly configured components having a variety of colors and textures, said components being removable and replaceable without being impeded by or supported from said socket.

2. The device of claim 1 wherein said socket comprises a power distribution socket, including terminals for connecting a plurality of wires.

3. The device of claim 2 further comprising switch means for electrically disconnecting at least one of said terminals.

4. The device of claim 2 wherein said socket further comprises ground fault interruption means.

5. The device of claim 1 further comprising a second socket.

6. The device of claim 5 wherein said plurality of decorative components, when attached to said support means, have at least one opening to permit insertion of a plurality of said plugs into said sockets.

7. The device of claim 1 wherein said socket comprises a telephone jack.

8. The device of claim 7 wherein said plurality of decorative components, when attached to said support means, have at least one opening to permit insertion of a telephone plug into said socket.

9. The device of claim 1 wherein said socket comprises a cable jack.

10. The system of claim 9 wherein said plurality of decorative components, when attached to said support means, have at least one opening to permit insertion of a cable plug into said socket.

11. The device of claim 1 wherein at least one of said decorative components is attachable to said support means with a screw.

12. The device of claim 1 wherein said support means and at least one of said decorative components include means to permit snap attachment of said at least one decorative component to said support means.

13. The device of claim 1 wherein at least one of said decorative components is retained by another one of said decorative components.

14. The device of claim 1 wherein said plurality of decorative components have no visible fasteners when attached to said support means.

15. The device of claim 1 wherein said decorative components include a designer wallplate.

16. The device of claim 1 wherein at least one of said decorative components is molded of colored plastic.

17. The device of claim 2 wherein said plurality of decorative components, when attached to said support means, have at least one opening to permit insertion of an electric plug into said socket.

18. The device of claim 17 further comprising openings to permit the operation of a manually adjustable actuator when said plurality of decorative components are attached to said support means.

19. A facade assembly for an electric receptacle having one or more sockets comprising, in combination:
 a) a generally rectangular yoke plate,
 b) a generally rectangular cover plate, and
 c) a wallplate;
 said yoke plate having
  i) a first through opening in said yoke plate for a fastener to attach said yoke plate to said receptacle,
  ii) at least one second through opening to permit each socket of said receptacle to extend through said yoke plate, and
  iii) a plurality of connector means to permit attachment of said cover plate in substantially parallel and juxtaposed relationship to said yoke plate;
 said cover plate having
  i) a first surface that faces said yoke plate and a second surface opposite to said first surface,
  ii) a slightly raised area extending from said second surface to form a third surface, which is generally parallel to said second surface and which has a generally rectangular perimeter,
  iii) a plurality of connector means for alignment with said connector means in said yoke plate,
  iv) a plurality of through openings within the perimeter of said third surface for alignment with openings in said socket to permit three prongs of a standard electric plug to be operatively inserted into said socket while said yoke and cover plates are attached to said receptacle, and
  v) a plurality of snap attachment means; and
 said wallplate having
  i) an interior surface that faces said cover plate and an exterior surface opposite to said interior surface,
  ii) a plurality of snap attachment means extending from said interior surface for engagement with corresponding ones of said snap attachment means of said cover plate for demountable engagement of said wallplate in substantially parallel and juxtaposed relationship with said cover plate,
  iii) a substantially rectangular through opening to surround and adjoin said perimeter of said third surface of said cover plate, said exterior surface being substantially flat, having no features that relate to said snap connectors, and having length and width at least equal to the length and width of said cover plate.

20. A wallbox mountable electric device comprising, in combination:
 a) an electric socket for receiving a plug,
 b) means for supporting said socket, said support means preventing access to the interior of said wallbox, and
 c) a plurality of decorative components attachable to said support means, each component being individually removable and replaceable by any one of a plurality of similarly configured components having a variety of colors and textures.

21. A wallbox mountable electric device comprising, in combination:
 a) an electric socket for receiving a plug,
 b) means for supporting said socket, said support means preventing access to the interior of said wallbox, and
 c) decorative cover means, removably attachable to said support means, for substantially covering said socket, said cover means having a decorative surface, uninterrupted by visible attachment means, with at least one opening to permit insertion of a plug into said socket.

22. A wallbox mountable electric device comprising, in combination:
 a) an electric socket for receiving a plug,
 b) means for supporting said socket, and
 c) decorative cover means, removably attachable to said support means, for substantially covering said socket, said cover means having a decorative surface, uninterrupted by visible attachment means, with at least one opening to permit insertion of a plug into said socket, said decorative surface of said decorative cover means fitting within an opening of a designer wallplate.

* * * * *